United States Patent
Bruce

(10) Patent No.: US 12,541,910 B2
(45) Date of Patent: Feb. 3, 2026

(54) GRAPHICS PROCESSOR FOR RENDERING IMAGES USING RAY TRACING

(71) Applicant: Arm Limited, Cambridge (GB)

(72) Inventor: Richard Edward Bruce, Great Shelford (GB)

(73) Assignee: Arm Limited, Cambridge (GB)

(*) Notice: Subject to any disclaimer, the term of this patent is extended or adjusted under 35 U.S.C. 154(b) by 265 days.

(21) Appl. No.: 18/220,478

(22) Filed: Jul. 11, 2023

(65) Prior Publication Data
US 2025/0022208 A1    Jan. 16, 2025

(51) Int. Cl.
*G06T 1/20*    (2006.01)
*G06T 15/06*    (2011.01)
*G06T 17/00*    (2006.01)

(52) U.S. Cl.
CPC ............... *G06T 15/06* (2013.01); *G06T 1/20* (2013.01); *G06T 17/005* (2013.01); *G06T 2210/21* (2013.01)

(58) Field of Classification Search
CPC ......... G06T 1/20; G06T 15/06; G06T 17/005; G06T 2210/21
USPC ...................................................... 345/418
See application file for complete search history.

(56) References Cited

U.S. PATENT DOCUMENTS

| | | | |
|---|---|---|---|
| 2023/0252725 A1* | 8/2023 | Mcallister | G06T 17/005 345/419 |
| 2023/0252727 A1* | 8/2023 | Mcallister | G06T 17/005 345/419 |
| 2024/0127527 A1* | 4/2024 | Smith-Lacey | G06T 15/06 |

\* cited by examiner

*Primary Examiner* — Jacinta M Crawford
(74) *Attorney, Agent, or Firm* — Leveque Intellectual Property Law, P.C.

(57) ABSTRACT

The present disclosure relates to a graphics processor comprising: storage; execution circuitry to execute programs to perform graphics processing operations using a ray tracing process to generate a render output representative of a view of a scene; and ray tracing circuitry to trace a ray by performing tests to determine whether the ray may intersect geometry in the scene, the ray tracing circuitry being configured to store one or more test record entries for a ray being traced in the storage, each test record entry being indicative of a test to be performed to trace the ray, wherein the ray tracing circuitry is further configured to store distance data respective of one or more test record entries, the distance data respective of a test record entry being data representative of a distance to a volume of the scene associated with the test record entry.

17 Claims, 12 Drawing Sheets

GRAPHICS PROCESSOR FOR RENDERING IMAGES USING RAY TRACING

FIELD OF THE INVENTION

The present technology relates to graphics processing systems, and in particular to the rendering of frames (images) for display using ray tracing.

BACKGROUND

Optical ray tracing is a process of rendering images in computer graphics environments, in which a light ray is traced from an imaginary eye or camera (ray origin) through each sampling position in a frame, and the data value of a sampling position is determined based on geometry (e.g. an object or object primitive) which the ray intersects. Depending on the specific ray tracing rendering process being used (and the stage of the ray tracing rendering process that has been reached for a given sampling position), the ray that is being cast may comprise a primary ray (e.g. from a viewpoint through a sampling position in an image plane into the scene), or a further (secondary) ray, for example, that has been cast from a determined intersection with geometry by a primary ray e.g. to determine lighting, shadowing and/or reflections, etc.

Ray tracing is considered to provide better, e.g. more realistic, physically accurate images than more traditional rasterization rendering techniques, particularly in terms of the ability to capture reflection, refraction, shadows and lighting effects. However, ray tracing can be significantly more processing-intensive than conventional rasterization.

In one approach, the distribution of geometry or primitives in a scene may be regarded as being enclosed in a set of hierarchical bounding volumes to reduce the amount of computation required for ray tracing. For a given ray to be traced, a larger bounding volume may first be tested to determine if it intersects the ray, and if an intersection is determined, successive smaller bounding volumes recursively subdivided from the larger bounding volume may be tested in turn. The hierarchy of bounding volumes may be represented as a tree, in which the top node of the tree, or root, represents a bounding volume that encompasses all geometry in a scene. The top node branches out into two or more child nodes, which represent smaller subdivision of bounding volume, or leaf nodes, which represent the smallest subdivision of bounding volume. Each child node then in turn branches out into two or more child nodes or leaf nodes, until a leaf node is reached along every branch.

The nodes of the tree representation of hierarchical bounding volumes may be arranged into acceleration data structures. For example, the top nodes of the tree may be grouped into a top-level acceleration structure (TLAS) while the bottom nodes of the tree may be grouped into a bottom-level acceleration structure (BLAS). The TLAS comprises the root node and a plurality of child nodes and leaf nodes. The leave nodes of the TLAS each point to a root node of the BLAS, and the leaf nodes of the BLAS are the leaf nodes of the tree, each representing the smallest subdivision of bounding volume and may include one or more primitives. At a leaf node of the TLAS, a rigid body transform is performed, and a pointer is generated which points to a BLAS. A rigid body transform is used so as to minimise or avoid generating multiple copies of the same primitives. It is therefore possible for more than one TLAS leaf node to point to the same BLAS.

While organising the distribution of geometry in a scene as described above helps reduce the amount of computation required in a ray tracing rending process, there remains scope for improved techniques for performing ray tracing using a graphics processor.

BRIEF DESCRIPTION OF THE DRAWINGS

Embodiments will now be described, with reference to the accompanying drawings, in which.

DETAILED DESCRIPTION

Figure 1:
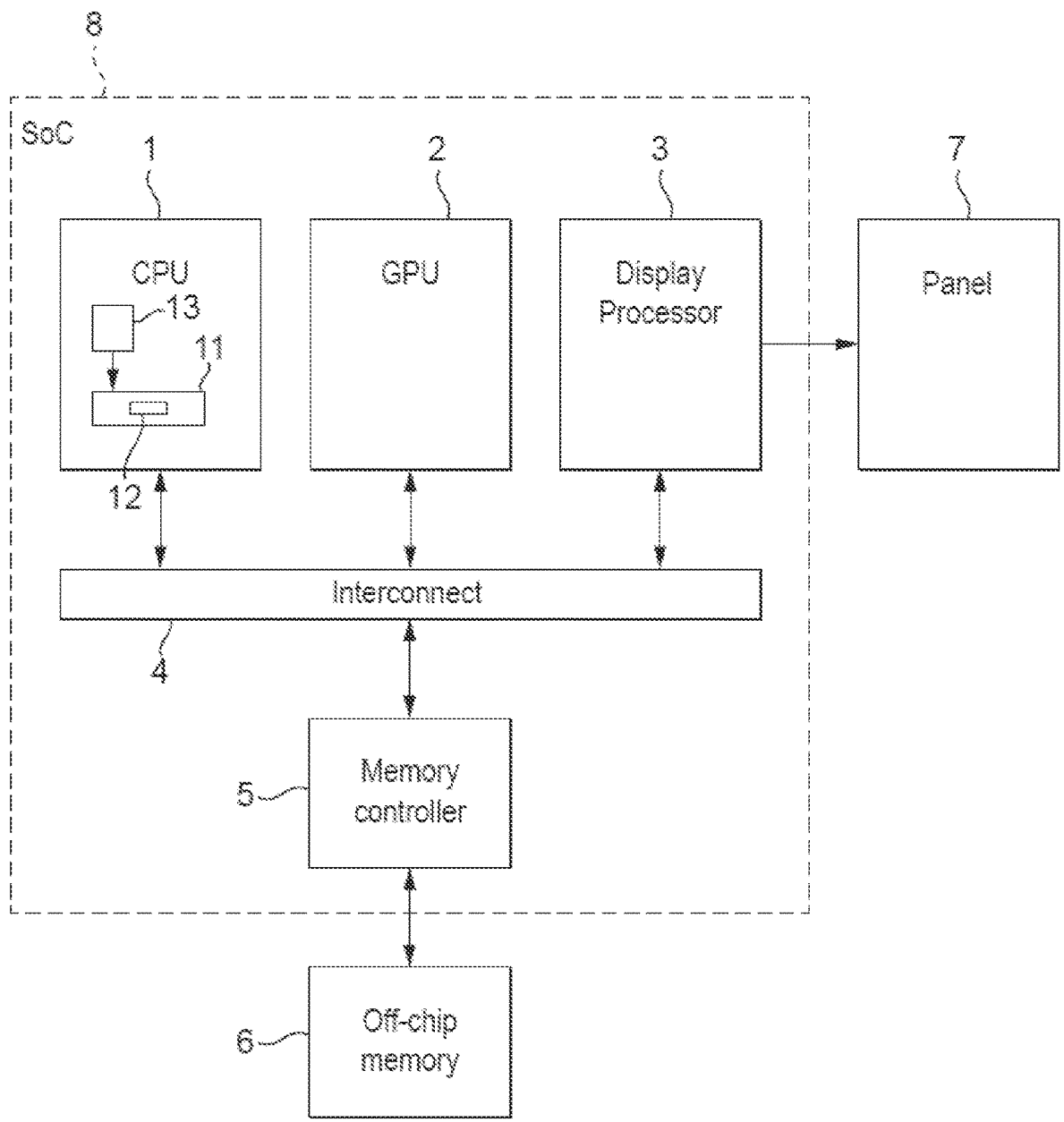
FIG. 1 shows an exemplary graphics processing system.

In view of the foregoing, an aspect of the present technology provides a graphics processor comprising: storage; execution circuitry to execute programs to perform graphics processing operations using a ray tracing process to generate a render output representative of a view of a scene; and ray tracing circuitry to trace a ray by performing tests to determine whether the ray intersects geometry in the scene, the ray tracing circuitry being configured to store one or more test record entries for a ray being traced in the storage, each test record entry being indicative of a test to be performed to trace the ray, wherein the ray tracing circuitry is further configured to store distance data respective of one or more test record entries, the distance data respective of a test record entry being data representative of a distance to a volume of the scene associated with the test record entry.

The graphics processor of the present technology is operable to perform ray tracing, for example, to generate a render output, such as a frame for display that represents a view of a scene comprising one or more objects. The graphics processor may typically generate plural render outputs, e.g. a series of frames. A render output typically comprises an array of data elements (sampling points) (e.g. pixels), for each of which appropriate render output data (e.g. a set of colour value data) is generated by the graphics processor. A render output data may comprise colour data, for example, a set of red, green and blue, RGB values and a transparency (alpha, a) value.

The storage of the graphics processor may comprise any suitable storage. The storage may be local to (e.g. on the same chip as) the graphics processor. The storage may comprise a set of registers and/or RAM, and e.g. form part of a cache system for the graphics processor. The storage may in some embodiments has a fixed storage capacity.

Typically, in ray tracing, one or more rays are used to render a (each) sampling position in the render output, and for each ray being traced, it is determined which geometry that is defined for the render output is intersected by the ray (if any). Geometry determined to be intersected by a ray may then be further processed, e.g. in order to determine a colour for the sampling position in question.

The geometry to be processed to generate a render output may comprise any suitable and desired graphics processing geometry. In some embodiments, the geometry may comprise graphics primitives; in other embodiments, the geometry may be in the form of polygons, such as triangles, or bounding box primitives.

In embodiments of the present technology, the ray tracing circuit makes use of a test (traversal) record to manage its traversal and testing operations. A separate test record may be maintained for each ray being traced, or a combined test record may be maintained, e.g. for a group of plural rays being traced together. In some embodiments, a test record may comprise a list of entries indicating which portions or volumes of a scene have been determined to be intersected by a ray (and may need to be tested against the ray). For example, in order to track which volumes are intersected by a ray, and therefore need to be tested against the ray, whenever it is determined that a ray intersects a given volume, an indication that the volume is intersected is then pushed (added) to the test record for the traversal operation. The record of which volumes contain geometry that might be intersected by a ray can then be read (by the ray tracing circuitry) to determine which volumes need to be tested, e.g. at the next level, and so on.

The ray tracing circuitry uses the storage to store a test record for a (each) ray it is tracing. Thus, the ray tracing circuitry generates test (traversal) record entries, stores the generated test record entries in the storage, reads the stored test record entries from the storage, and processes test record entries read from the storage. For example, the records may be stored in the form of a suitable stack, and may be managed using a "last-in-first-out" scheme, e.g. in the usual way for a stack. Thus, for example, when the testing of a parent node indicates that one or more of its child nodes are intersected, the child nodes may be pushed (added) to the stack, and nodes are popped out (removed) for testing accordingly. In some examples, the ray tracing circuitry may use registers (of the storage) to store the top entry of the stack, and use RAM (of the storage) to store other entries of the stack.

According to embodiments of the present technology, in addition to storing test record entries that indicate which portions/volumes of a scene have been determined to be intersected by a ray, the ray tracing circuitry further stores distance data for respective test record entries that is representative of the distance to the associated volumes of the scene. In doing so, it is possible for the ray tracing circuitry to use the additional information to assess the relevance of a test record entries.

Another aspect of the present technology provides a method of operating a graphics processing system when rendering a frame representative of a view of a scene comprising one or more objects using a ray tracing process, the graphics processing system comprising a graphics processor that comprises storage, execution circuitry, and ray tracing circuitry, the method comprising: the execution circuitry executing programs to perform graphics processing operations using a ray tracing process to generate a render output representative of a view of a scene; the ray tracing circuitry tracing a ray by performing tests to determine whether the ray intersects geometry in the scene, and storing one or more test record entries for a ray being traced in the storage, each test record entry being indicative of a test to be performed to trace the ray; and the ray tracing circuitry storing distance data respective of one or more test record entries, the distance data respective of a test record entry being data representative of a distance to a volume of the scene associated with the test record entry.

The graphics processor may carry out ray tracing graphics processing operations in any suitable and desired manner. In some embodiments, the graphics processor comprises one or more programmable execution units/circuitry (e.g. shader cores) operable to execute programs to perform graphics processing operations, and ray-tracing based rendering is triggered and performed by a programmable execution unit of the graphics processor executing a graphics processing (e.g. shader) program that causes the programmable execution unit to perform ray tracing rendering processes.

Thus, a further aspect of the present technology provides a non-transitory computer readable storage medium storing software code which when executing on one or more processors performs a method of compiling a shader program to be executed by a graphics processor operable to execute graphics processing programs to perform graphics processing operations, the graphics processor comprising storage, execution circuitry, and ray tracing circuitry, the shader program comprising instructions which, when executed, cause: the execution circuitry to execute programs to perform graphics processing operations using a ray tracing process to generate a render output representative of a view of a scene; and the ray tracing circuitry to trace a ray by performing tests to determine whether the ray intersects geometry in the scene, to store one or more test record entries for a ray being traced in the storage, each test record entry being indicative of a test to be performed to trace the ray, and to store distance data respective of one or more test record entries, the distance data respective of a test record entry being data representative of a distance to a volume of the scene associated with the test record entry.

In some embodiments, a program may be executed by a group of plural execution threads together, e.g. and in embodiments, one execution thread for each ray in a group of rays being traced together. Thus, in embodiments, each ray is traced by a respective execution thread executing an appropriate (e.g. shader) program.

In some embodiments, the ray tracing circuitry may be configured to determine, for a volume of the scene, whether a distance (e.g. from a ray origin) to the volume is within a ray maximum range, and to not store a test record entry associated with the volume when the distance to the volume is not within the ray maximum range. In doing so, volumes of the scene which the ray is unlikely to reach and therefore unlikely to intersect may be prevented from being added as test record entries. It is therefore possible to reduce the number of test record entries and in turn the amount of computation.

In some embodiments, upon determining that the ray intersects geometry in the volume the ray tracing circuitry may be configured to update the ray maximum range based on the distance to the geometry in the volume. For each ray, ray tracing tests are performed so as to find geometry closest to the ray origin. As such, when it is determined that geometry in a volume intersects the ray, it may be assumed that geometry behind the intersecting volume with respect to the ray origin is no longer of interest. The distance to the geometry in the volume is used (e.g. instead of the distance to the volume) to update the ray maximum range since two or more volumes may be overlapping, and the distance to the geometry in the volume is greater than or equal to the distance to the volume, therefore giving a more conservative ray maximum range. By updating the ray maximum range to the distance of the intersecting volume, volumes of the scene that are behind the volume with intersecting geometry may be excluded from ray tracing tests.

In some embodiments, the ray tracing circuitry may be configured to compare the stored distance data with the updated ray maximum range, and to discard a test record entry when the distance data associated with the test record entry exceeds the updated ray maximum range. Conventionally, once a test record entry is added to storage, it will no longer be possible to remove the test record entry based on ray maximum range even when the volume of the scene associated with that test record entry has a distance exceeding an updated ray maximum range, and so a ray tracing test will be performed on the volume indicated by the test record entry even though this volume is no longer relevant. This is because in general, distance data does not form part of a test record entry once it has been generated. According to embodiments of the present technology, distance data representative of the distance to a volume of the scene is stored with the associated test record entry. In doing so, it is possible to compare the stored distance data with the updated ray maximum range, and to discard the test record entry if the distance data indicates that the associated volume has a distance exceeding the updated ray maximum range.

In some embodiments, a distance to a volume of the scene may comprise a sign, and the ray tracing circuitry is configured to store distance data respective of a test record entry associated with the volume of the scene by discarding the sign of the distance to the volume. In a three-dimensional scene, there may be instances when parts of the scene are behind the viewpoint of the ray origin. The relative positions (behind or in front of the ray origin) of different volumes within the scene may be indicated by a sign appended to respective distances to the volumes, for example a negative (−) sign may indicate a volume behind the viewpoint of the ray origin. However, for the purpose of ray tracing, any parts of the scene that are behind the viewpoint of the ray origin, and therefore behind the ray origin, are not considered for ray tracing tests. The sign appended to respective distances is therefore not needed. Storing additional data places a higher demand on storage space and as such distance data is generally not stored. By discarding the sign of the distance to a volume, it is possible to reduce storage requirement for storing distance data to enable distance data to be stored.

In some embodiments, a distance to a volume of the scene may comprise an exponent, and the ray tracing circuitry may be configured to store distance data respective of a test record entry associated with the volume of the scene by rounding down the exponent of the distance to the volume.

In some embodiments, the exponent of the distance to the volume may be represented by a first plurality of exponent bits, and rounding down the exponent of the distance to the volume may truncate the first plurality of exponent bits to a second plurality of exponent bits such that the distance data respective of the test record entry associated with the volume of the scene comprises the second plurality of exponent bits less than the first plurality of exponent bits.

In some embodiments, a distance to a volume of the scene may comprise a mantissa, and the ray tracing circuitry may be configured to store distance data respective of a test record entry associated with the volume of the scene by rounding down the mantissa of the distance to the volume.

In some embodiments, the mantissa of the distance to the volume may be represented by a third plurality of mantissa bits, and rounding down the mantissa of the distance to the volume may truncate the third plurality of mantissa bits to a fourth plurality of mantissa bits such that the distance data respective of the test record entry associated with the volume of the scene comprises the fourth plurality of mantissa bits less than the third plurality of mantissa bits.

By approximating the distance to a volume, it is possible to reduce the number of bits required to store distance data, reducing storage requirement for each distance, thereby enabling more distances to be stored. In general, a distance to a volume may be represented by a combination of an exponent (giving the range of the distance value) and a mantissa (giving the precision of the distance value). Approximation of a distance value may be done through truncating the exponent (reducing the number of bits allocated to the exponent) and/or truncating the mantissa (reducing the number of bits allocated to the mantissa). Moreover, according to some embodiments, a conservative approximation of a distance value is made by rounding down the distance to a volume, such that false positives (distances slightly above the ray maximum range being considered within range) are accepted in favor over false negative (distances slightly below the ray maximum range being considered outside range). While false positives may lead to an increase in ray tracing computation that turns out to be unnecessary, rounding down of distance values in favor of false positives ensures that volumes at distances close to the ray maximum range are not missed.

In some embodiments, the ray tracing circuitry may be configured to perform tests to determine whether the ray intersects geometry in the scene by performing a traversal of a ray tracing acceleration data structure indicative of the distribution of geometry for the scene.

In some embodiments, the ray tracing acceleration data structure may comprise one or more nodes, each node representing a volume of the scene.

The (ray tracing circuitry of the) graphics processor may trace individual rays separately, or in some embodiments, the graphics processor may trace a group of plural rays together. In embodiments where the ray tracing circuitry traces a group of plural rays together, for example, all of the rays in a group of rays may traverse (visit) the nodes of the ray tracing acceleration data structure in the same node order.

Determining which geometry (if any) is intersected by a ray can be performed in any suitable and desired manner. In general, there may be many millions of graphics primitives within a given scene, and millions of rays to be tested, such that it is not normally practical to test every ray against each and every graphics primitive. To speed up the ray tracing operation, in some embodiments, a ray tracing acceleration data structure is used, such as a bounding volume hierarchy (BVH), that is representative of the distribution of the geometry in the (e.g.) scene that is to be rendered to determine the intersection of rays with geometry (e.g. objects) in the scene being rendered (and then render sampling positions in the output rendered frame representing the scene accordingly). However, other forms of acceleration data structure, such as a KD tree, voxels (grid hierarchies), etc., could be used, if desired.

Ray tracing, according to some embodiments, therefore generally comprises (the ray tracing circuit) performing a traversal of the ray tracing acceleration data structure, which traversal involves testing rays for intersection with volumes represented by different nodes of the ray tracing acceleration data structure in order to determine which geometry may be intersected by which rays for a sampling position in the render output, and which geometry therefore needs to be further processed for the rays for the sampling position.

A ray tracing acceleration data structure may be arranged in any suitable and desired manner. In some embodiments, the ray tracing acceleration data structure comprises a tree structure in which a plurality of nodes is arranged. At least one of the nodes of the ray tracing acceleration data structure is associated with a respective set of plural child nodes. In practice, there are multiple such nodes in the ray tracing acceleration data structure. These nodes may be referred to as "parent" nodes. They may also be referred to an "internal" or "non-leaf" nodes, for example, depending on the arrangement of the ray tracing acceleration data structure. The tree structure is configured such that each end (e.g. leaf) node of the tree structure represents a set of geometry (e.g. primitives) defined within the respective volume to which the end (e.g. leaf) node corresponds. The remaining (non-leaf) nodes represent hierarchically arranged larger volumes up to a root node at the top level of the tree structure that represents an overall volume for the render output (e.g. scene) to which the tree structure corresponds. Each non-leaf node may be a parent node for a respective set of plural child nodes, with the parent node volume encompassing the volumes of its respective child nodes.

Thus, in embodiments, traversal of the ray tracing acceleration data structure comprises (the ray tracing circuitry) proceeding down the "branches" of the tree structure and testing the rays against the child volumes associated with a node at a first level of the tree structure to thereby determine which child nodes in the next level of the tree structure should be tested, and so on, down to the level of the respective end (e.g. leaf) nodes at the end of the branches of the tree structure.

A ray tracing acceleration data structure may comprise a single tree structure (e.g. BVH) representing the entirety of a scene being rendered, or a ray tracing acceleration data structure may comprise multiple "levels" of tree structures (e.g. BVHs). For example, in some embodiments, the ray tracing acceleration data structure may comprise one or more "lowest level" tree structures (e.g. BVHs) (referred to as a "bottom level acceleration structure" or BLAS), that each represent a respective instance or object within a scene to be rendered, and a "highest level" tree structure (e.g. BVH) (referred to as a "top level acceleration structure" or TLAS) that points to the one or more "lowest level" tree structures. In this case, each "lowest level" tree structure may comprise end (e.g. leaf) nodes that represent a set of geometry (e.g. primitives) associated with the respective instance or object, and the "highest level" tree structure may comprise end (e.g. leaf) nodes that point to the root node of one or more of the one or more "lowest level" tree structures.

In some embodiments, each "lowest level" tree structure (e.g. BLAS) is defined in a space that is associated with the respective instance or object, e.g. a model space, whereas the "highest level" tree structure (e.g. TLAS) is defined in a space that is associated with the entire scene, e.g. a world space. In this case, each "highest level" tree structure end (e.g. leaf) node may include information indicative of an appropriate transformation between respective spaces. Correspondingly, traversal of the ray tracing acceleration data structure may comprise, when an end (e.g. leaf) node of the "highest level" tree structure is reached, applying a transformation (e.g. rigid body transformation) indicated by the end (e.g. leaf) node, and then beginning traversal of the corresponding "lowest level" tree structure.

Once it has been determined by performing a traversal operation for a ray which end (e.g. leaf) nodes represent geometry that may be intersected by a ray, the actual geometry intersections for the ray for the geometry that occupies the volumes associated with the intersected end (e.g. leaf) nodes can be determined accordingly, e.g. by testing the ray for intersection with the individual units of geometry (e.g. primitives) defined for the render output (e.g. scene) that occupy the volumes associated with the end (e.g. leaf) nodes. Thereafter, once the geometry intersections for the rays being used to render a sampling position have been determined, it can then be determined what appearance the sampling position should have, and the sampling position rendered accordingly.

Thus, in embodiments, the (e.g. ray tracing circuitry of the) graphics processor is operable to perform ray-volume intersection tests in which it is determined whether a ray intersects a volume represented by a node of the ray tracing acceleration data structure, and ray-geometry (e.g. primitive) intersection tests in which it is determined whether a ray intersects geometry (e.g. a primitive) occupying a volume represented by a node of the ray tracing acceleration data structure.

Ray-volume intersection tests and/or ray-geometry (e.g. primitive) intersection tests may be performed by a programmable execution unit/circuitry of the graphics processor executing an appropriate program. In some embodiments, the (e.g. ray tracing circuitry of the) graphics processor may comprise a ray-volume intersection testing circuitry that is operable to perform ray-volume intersection tests, which may be a (substantially) fixed function circuit. In some embodiments, the (e.g. ray tracing circuitry of the) graphics processor may comprises a ray-geometry (e.g. primitive) intersection testing circuit that is operable to perform ray-geometry (e.g. primitive) intersection tests, which may be a (substantially) fixed function circuit.

In some embodiments, the one or more nodes of the ray tracing acceleration data structure may be arranged in a hierarchy of bounding volume, and the ray tracing circuitry may be configured to only store distance data for nodes near the bottom of the hierarchy. In alternative embodiments, the ray tracing circuitry may be configured to only store distance data for nodes near the top of the hierarchy. Nodes close to the bottom of the bounding volume hierarchy (e.g. BLAS) altogether cover a larger range of distances and there are more nodes near the bottom of the hierarchy than at the top. As such, storing the distances of nodes near the bottom of the hierarchy and comparing these distances to the (updated) ray maximum range has a higher likelihood that at least some of these nodes have distances exceeding the (updated) ray maximum range the test record entries of which can be discarded (the node being "culled"). Nodes close to the top of the hierarchy (e.g. TLAS) each covers more branches and a larger range of distances, and by storing the distances of nodes near the top of the hierarchy and comparing these distances to the (updated) ray maximum range may lead to one or more such nodes being culled from ray tracing test, which can greatly reduce the number of traversal steps and intersection tests that need to be performed for a given ray.

As briefly discussed above, depending upon the ray tracing rendering process being used (and the stage of the ray tracing rendering process that has been reached for a given sampling position), the ray that is being cast could comprise a primary ray (e.g. from a viewpoint through a sampling position in an image plane into the scene), or a further (secondary) ray, e.g. that has been cast from a determined intersection with geometry by a primary ray, e.g., and in an embodiment, to determine lighting/shadowing and/or reflections, etc. The operation in the manner of the technology described herein is applicable whatever form of ray is being cast.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered. In this case, the graphics processor can generate the ray tracing acceleration data structure in any suitable and desired manner, for example by testing geometry defined for the scene against respective bounding volumes, so as to determine the distribution of the geometry in a bounding volume hierarchy for the scene.

It could also or instead be generated by a CPU (e.g. host processor), e.g. based on an indication of geometry for the scene, e.g. in a preliminary processing pass before the scene is rendered.

Other arrangements would, of course, be possible.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

An acceleration data structure is typically very extensive and can comprise a large number of nodes. As such, it is generally not desirable for a ray tracing process to follow every single branch and test every node from root to leaves due to the significant computation burden. Moreover, testing every single node is inefficient, in that, once a ray is intersected by an object in the scene (or a primitive or a group of primitives), then nodes associated with volumes behind the intersecting object are no longer relevant and so branches leading to these nodes may be culled to reduce the amount of computation required to test the current ray. In some embodiments, as an acceleration structure is traversed for a given ray, the nodes are tested in turn (one node at a time or multiple nodes in parallel) to determine if the volume associated with a node intersects the ray. When the volume associated with a node is determined to intersect the ray, the traversal follows branches of the node to test its child nodes. According to these embodiments, while one or some child nodes are tested, other child nodes that are yet to be tested may be stacked (having respective test record entries generated and stored), and nodes that are stacked and branches of these nodes are tested at a later time.

When nodes are tested, if the volume associated with a node is determined to have a distance value that exceeds a ray maximum range, this node and subsequent child nodes branching off this node are not stacked as they are deemed to be beyond the range of the ray. The ray maximum range for a given ray may e.g. initially be set at infinity, then, in some embodiments when the ray intersects with an object or primitive, the ray maximum range is adjusted to the distance to the object or primitive. Subsequently tested nodes are then stacked or not stacked based on the updated ray maximum range.

In conventional approaches, the distance to a volume associated with a node is not recorded when the node is stacked. As such, once a node is stacked, it cannot be removed until the node is tested, even if the distance associated with the node exceeds an updated ray maximum range. Instead, the child nodes branching from this node must be tested and removed one by one. Testing each child nodes of a stacked node associated with a volume having a distance exceeding an updated ray maximum range is an inefficient use of computing and power resources as well as time.

The Applicant has recognized that recording distances when stacking nodes may enable stacked nodes to be removed instead of having child nodes of the stacked nodes tested and removed one by one. However, allowing distances to be stored for all stacked nodes would require a significant storage area.

There is, therefore, scope for improving nodes stacking.

The present embodiments relate to the operation of a graphics processor, for example in a graphics processing system as illustrated in FIG. 1, when performing rendering of a scene to be displayed using a ray tracing-based rendering process.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 renders frames (images) to be displayed, and the display processor 3 then provides the frames to a display panel 7 for display.

In use of this system, an application 13 such as a game, executing on the host processor (CPU) 1, for example, requires the display of frames on the display panel 7. In particular, the application submits appropriate commands and data to a driver 11 for the graphics processor 2 that is executing on the CPU 1. The driver 11 then generates appropriate commands and data to cause the graphics processor 2 to render appropriate frames for display and to store those frames in appropriate frame buffers, e.g. in the main memory 6. The display processor 3 then reads those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value for a sampling position in the image (plane), is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Figure 2:
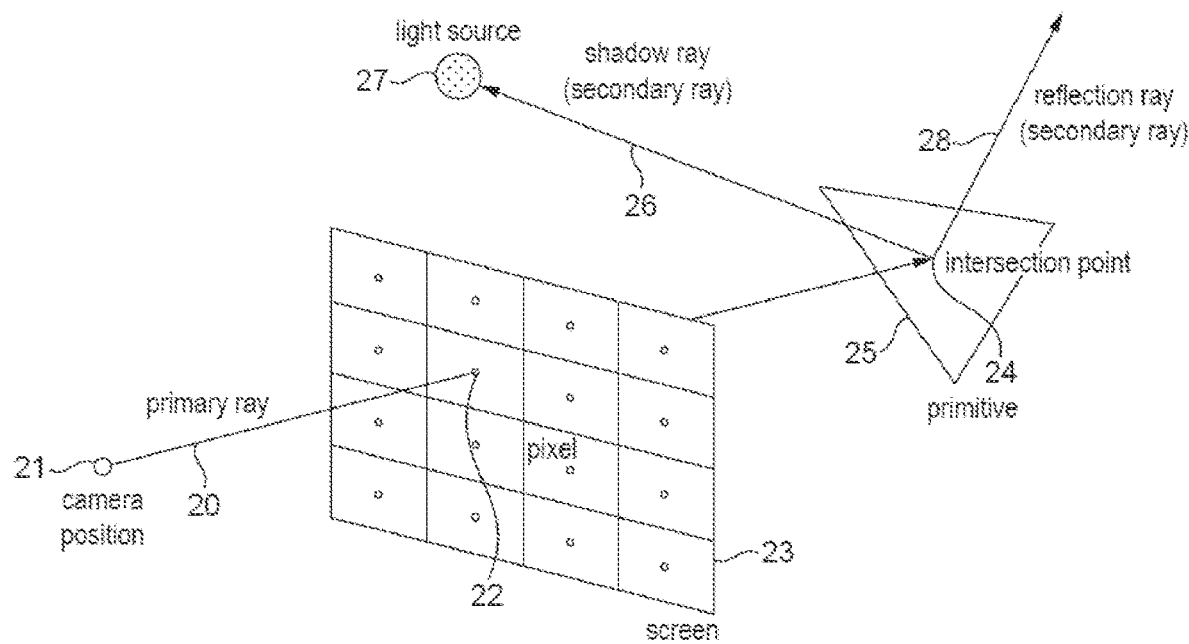
FIG. 2 shows a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection is with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered before tracing the reflected ray back to the light source. However, a higher number of bounces may be considered if desired.

The output data for the sampling position 22, such as a colour value (e.g. RGB value), is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments, acceleration data structures indicative of the (distribution of) geometry (e.g. objects) in scenes to be rendered are used when determining the intersection data for the ray(s) associated with a sampling position in the image plane to identify a subset of the geometry which a ray may intersect. The ray tracing acceleration data structure represents and indicates the distribution of geometry (e.g. objects) in the scene being rendered, and in particular the geometry that falls within respective (sub-) volumes in the overall volume of the scene (that is being considered).

In the present embodiments, a ray tracing acceleration data structure is in the form of one or more Bounding Volume Hierarchy (BVH) trees. The use of BVH trees allows and facilitates testing a ray against a hierarchy of bounding volumes until a leaf node is found. It is then only necessary to test the geometry associated with the particular leaf node for intersection with the ray.

Figure 3A:
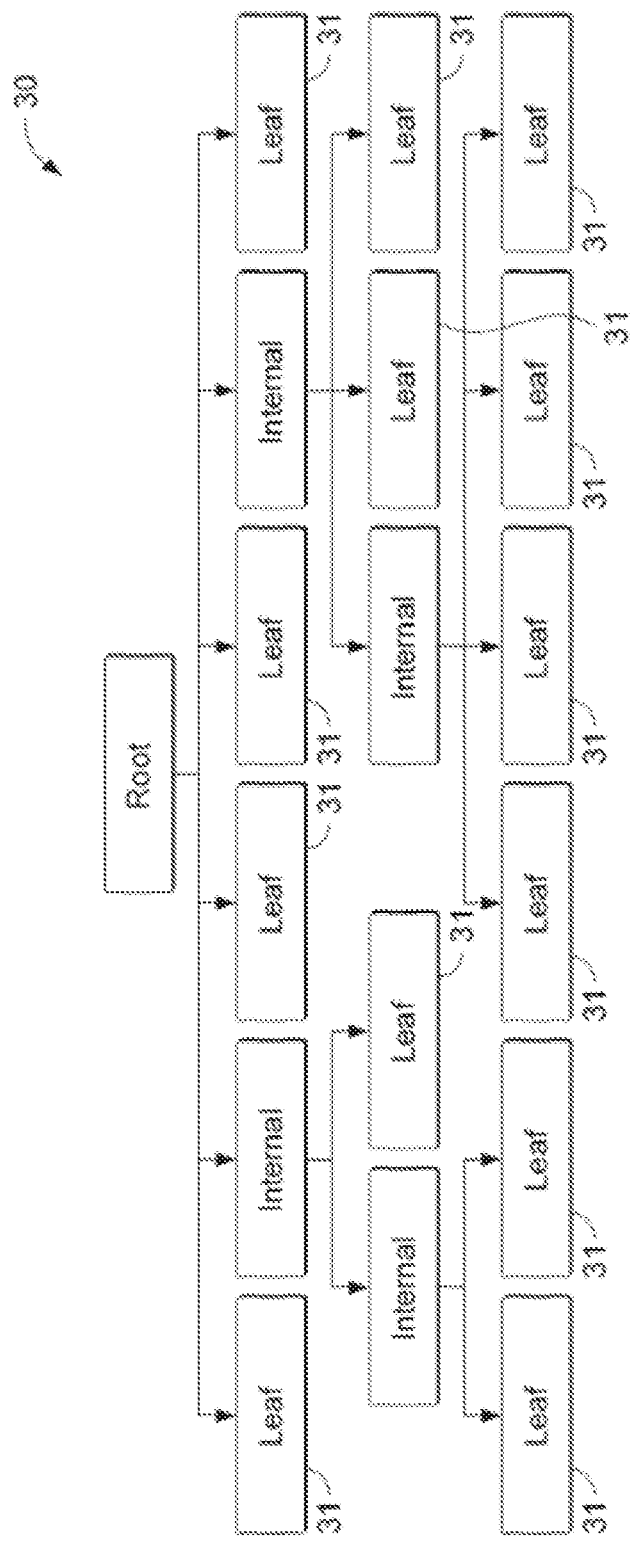
FIGS. 3A and 3B show exemplary ray tracing acceleration data structures.

FIG. 3A shows an exemplary BVH tree 30, constructed by enclosing a volume in an axis-aligned bounding volume (AABV), e.g. a cube, and then recursively subdividing the bounding volume into successive sub-AABVs according to any suitable and desired subdivision scheme, until a desired smallest subdivision (volume) is reached. In this example, the BVH tree 30 is a relatively "wide" tree wherein each bounding volume is subdivided into up to six sub-AABVs. However, in general, any other suitable tree structure may be used, and a given node of the tree may have any suitable and desired number of child nodes.

Each node in the BVH tree 30 has a respective volume associated with it, with the end or leaf nodes 31 each representing a particular smallest subdivided volume (which may encompass one or more primitives), and any parent node representing, and being associated with, the total volume of its child nodes.

A complete scene may be represented by a single BVH tree, e.g. with the tree representing the geometry for the scene in world space. In this case, each leaf node of the BVH tree 30 may be associated with the geometry defined for the scene that falls, at least in part, within the volume to which the leaf node corresponds (e.g. whose centroid falls within the volume in question). The leaf nodes 31 may represent unique (non-overlapping) subsets of primitives defined for the scene falling within the corresponding volumes for the leaf nodes 31.

Figure 3B:
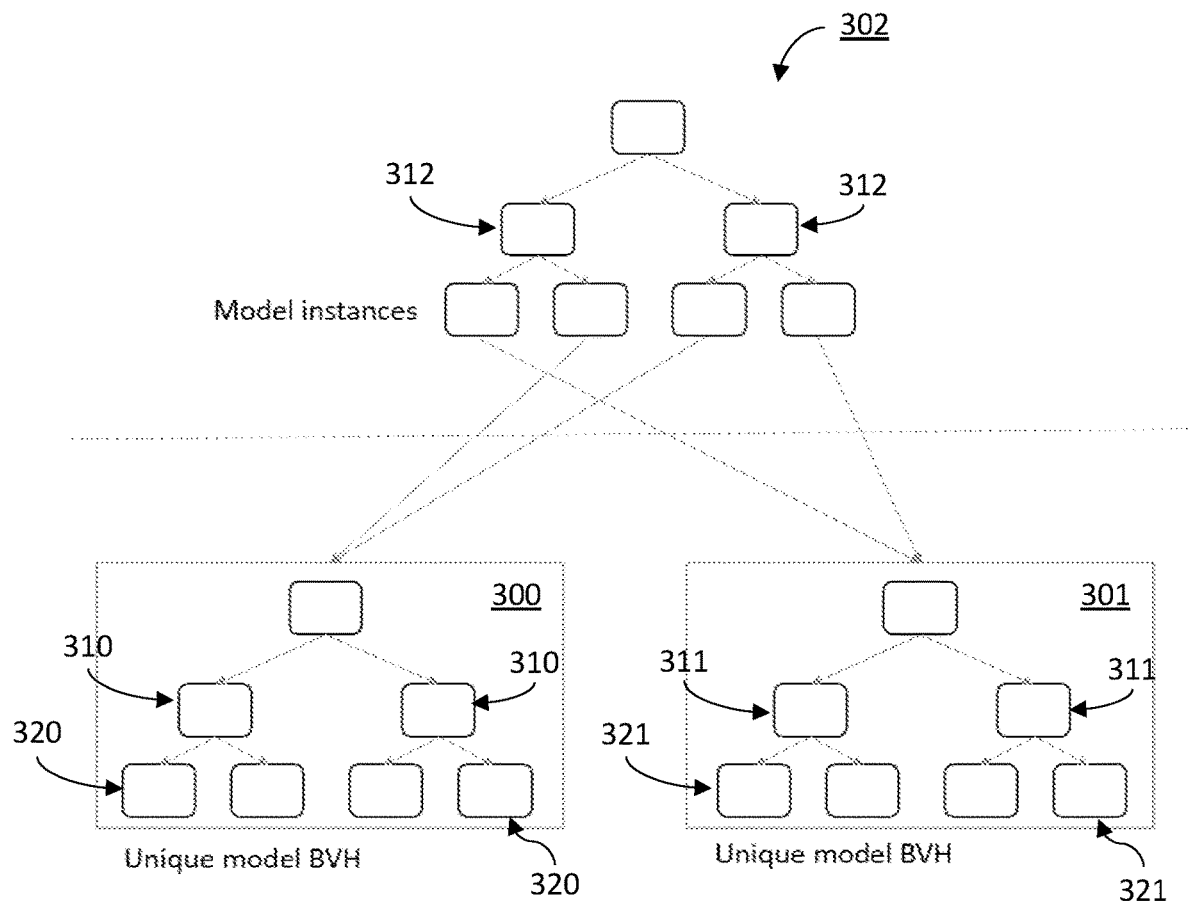

In the present embodiments, a two-level ray tracing acceleration data structure is used. FIG. 3B shows an exemplary two-level ray tracing acceleration data structure in which each instance or object is associated with a respective bottom-level acceleration structure (BLAS) 300, 301, which in the present embodiments is in the form of a respective BVH tree that stores geometry in model space, with each leaf node 310, 311 of the BVH tree representing a unique subset of primitives 320, 321 defined for the instance or object falling within the corresponding volume.

A separate top-level acceleration structure (TLAS) 302 contains references to the set of bottom-level acceleration structures (BLAS), together with a respective set of shading and transformation information for each bottom-level acceleration structure (BLAS). In the present embodiments, the top-level acceleration structure (TLAS) 302 is defined in world space and is in the form of a BVH tree having leaf nodes 312 that each point to one or more of the bottom-level acceleration structures (BLAS) 300, 301. Note that it is also possible for more than one model instances to point to the same BLAS.

Other forms of ray tracing acceleration data structure are of course possible.

Figure 4A:
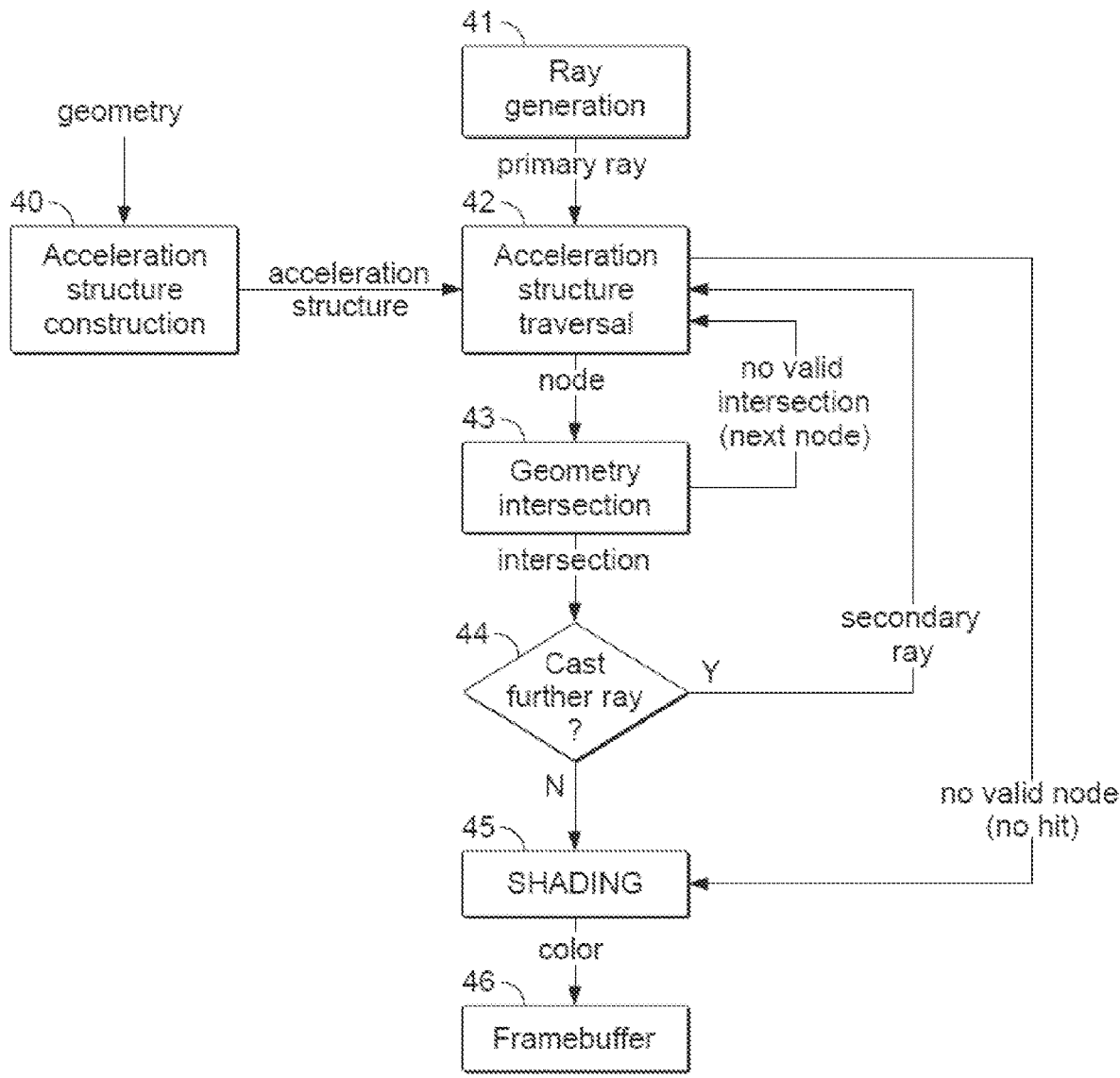
FIGS. 4A and 4B are flow charts illustrating exemplary full ray tracing process.

FIG. 4A is a flow chart showing an overall ray tracing process that may be performed on and by a graphics processor such as the graphics processor 2.

First, the geometry of the scene is analysed and used to obtain an acceleration data structure (step 40), for example in the form of one or more BVH tree structures, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume through which the ray passes containing geometry that the ray potentially intersects is identified. It is then determined whether the ray intersects any of the geometry, e.g. primitives, in that leaf node (step 43).

If no (valid) geometry can be identified in the node as being intersected by the ray, the process returns to step 42, and the ray continues to traverse the acceleration data structure, and the leaf node for the next volume through which the ray passes that may contain geometry with which the ray intersects is identified, and a test for intersection performed at step 43. This is repeated for each leaf node that the ray (potentially) intersects, until geometry that the ray intersects is identified.

When geometry that the ray intersects is identified, it is then determined whether to cast any further (e.g. secondary) rays for the primary ray (and thus sampling position) in question (step 44). This may be based, for example, on the nature of the geometry (e.g. its surface properties such as transparency and reflectiveness) that the ray has been found to intersect, and the complexity of the ray tracing process being used.

Thus, as shown in FIG. 4A, one or more secondary rays may be generated emanating from the intersection point (e.g.

a shadow ray(s), a refraction ray(s) and/or a reflection ray(s), etc.). Steps 42, 43 and 44 are then performed in relation to each secondary ray.

Once there are no further rays to be cast, a shaded colour for the sampling position to which the ray(s) correspond is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node can be identified as including geometry intersected by a given ray (whether primary or secondary) in step 42 (and there are no further rays to be cast for the sampling position), the process moves to step 45, and shading is performed. In this case, the shading is in an embodiment based on a form of "default" shading operation that is to be performed in such cases which no intersected geometry is found for a ray. This may comprise, for example, simply allocating a default colour to the sampling position, and/or having a defined, default geometry to be used in the case where no actual geometry intersection in the scene is found, with the sampling position then being shaded in accordance with that default geometry. Other arrangements are of course possible.

This process is performed for each sampling position to be considered in the image plane (frame). Once the final output value for the current sampling position has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Figure 4B:
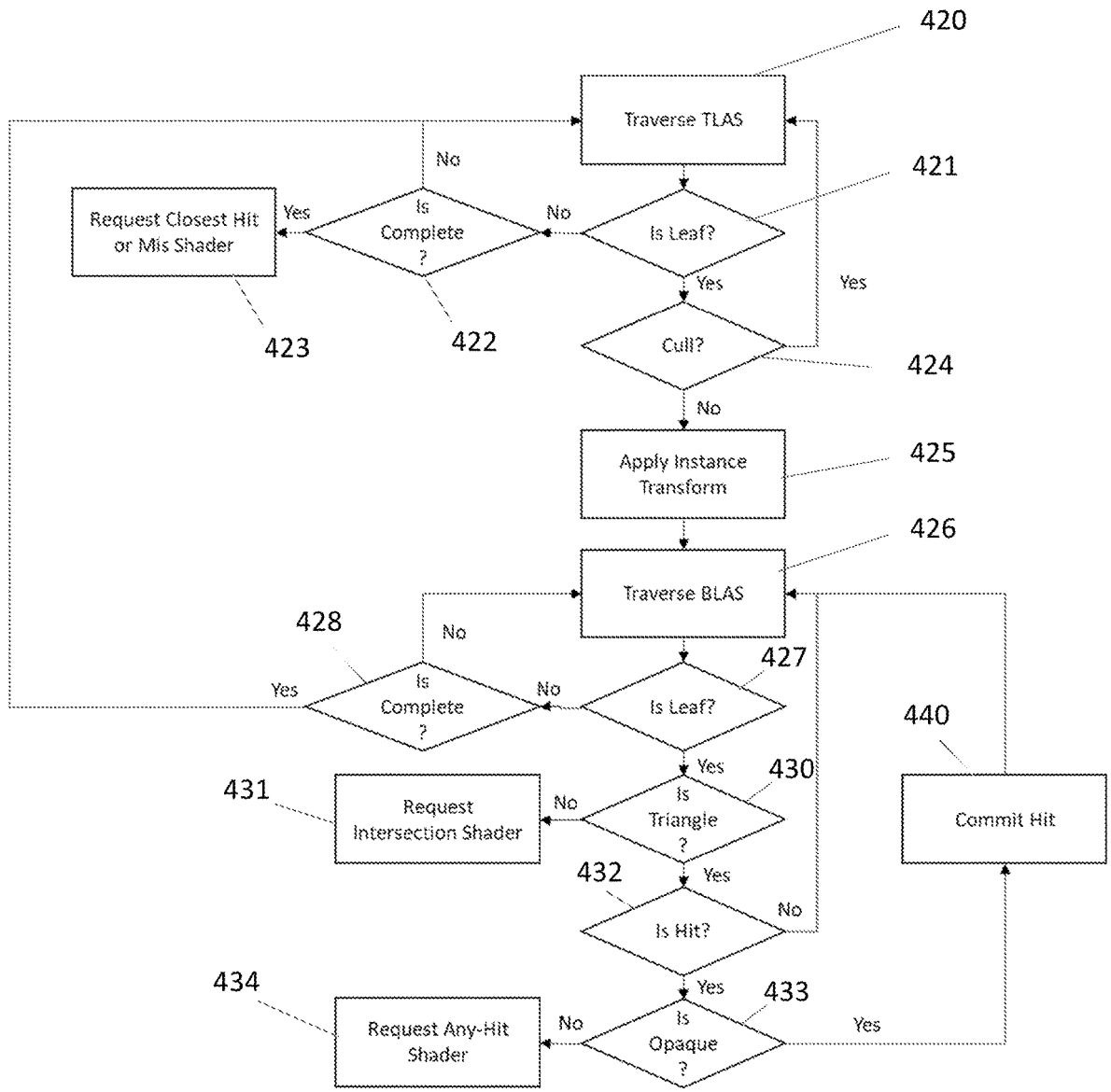

FIG. 4B is a flow chart showing in more detail acceleration structure traversal in the case of a two-level acceleration data structure, e.g. as described above with reference to FIG. 3B. As shown in FIG. 4B, in this case, acceleration structure traversal begins with TLAS traversal (step 420), and TLAS traversal continues in search of a TLAS leaf node (steps 421, 422). If no TLAS leaf node can be identified, a "default" shading operation ("miss shader") may be performed (step 423), e.g. as described above with reference to FIG. 4A.

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate space for BLAS traversal (step 425). BLAS traversal then begins (step 426) and continues in search of a BLAS leaf node (steps 427, 428). If no BLAS leaf node can be identified, the process may return to TLAS traversal (step 420).

In the present embodiments, geometry associated with a BLAS leaf node may, for example, be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430). As shown in FIG. 4B, when an axis aligned bounding box (AABB) primitive is encountered, execution of a shader program ("intersection shader") that defines a procedural object encompassed by the axis aligned bounding box (AABB) is triggered (step 431) to determine whether a ray intersects the procedural object defined by the shader program. On the other hand, when a set of triangle primitives is encountered, determination of whether a ray intersects any of the triangle primitives is performed by fixed function circuitry (step 432) (as will be discussed further below). Other arrangements are of course possible.

If no (valid) triangle primitives which the ray intersects can be identified in the node, the process returns to BLAS traversal (step 426). If a ray is found to intersect a triangle primitive, it is determined whether or not the triangle primitive is opaque (step 433). In the case of the triangle primitive being found not to be opaque, execution of an appropriate shader program ("any-hit shader") may be triggered (step 434). Otherwise, in the case of the triangle primitive being found to be opaque, the intersection can be committed without executing a shader program (step 440). Traversal for one or more secondary rays may be triggered, as appropriate, such as discussed above.

Figure 5:
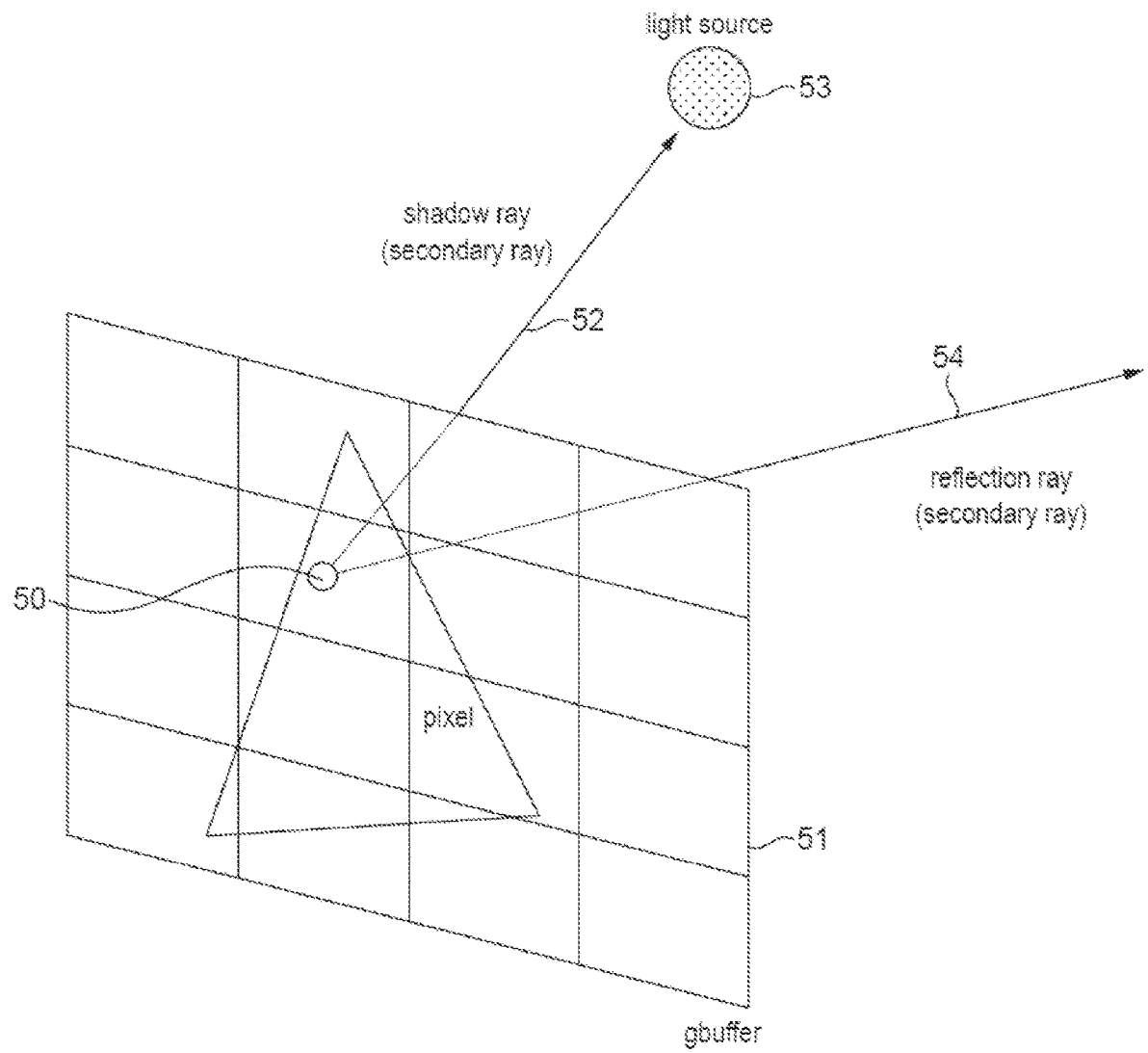
FIG. 5 is a schematic diagram illustrating a "hybrid" ray tracing process.

FIG. 5 shows an alternative ray tracing process which may be used in the embodiments, in which only some of the steps of the full ray tracing process described above are performed. Such an alternative ray tracing process may be referred to as a "hybrid" ray tracing process.

In such a process, as shown in FIG. 5, the first intersection point 50 for each sampling position in the image plane (frame) is instead determined first using a rasterization process and stored in an intermediate data structure known as a "G-buffer" 51. Thus, the process of generating a primary ray for each sampling position and identifying the first intersection point of the primary ray with geometry in the scene is replaced with an initial rasterization process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected and the interactions of the secondary rays with geometry in the scene.

Referring to the flowchart of FIG. 4A, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described with reference to FIG. 4A. Thus, steps 42, 43 and 44 will be performed in the same manner as previously described in relation to the full ray tracing process for any secondary rays.

The colour determined for a sampling position is written to the frame buffer in the same manner as step 46 of FIG. 4A, based on the shading colour determined for the sampling position based on the first intersection point (as obtained from the G-buffer), and, where applicable, the intersections of any secondary rays with objects in the scene, determined using ray tracing.

The present embodiments are applicable to the operation of a graphics processor when performing ray tracing-based rendering such as the ray tracing processes described above or any other form of ray tracing processes, and in particular to the ray tracing acceleration data structure traversal performed as part of the ray tracing operation.

Figure 6:
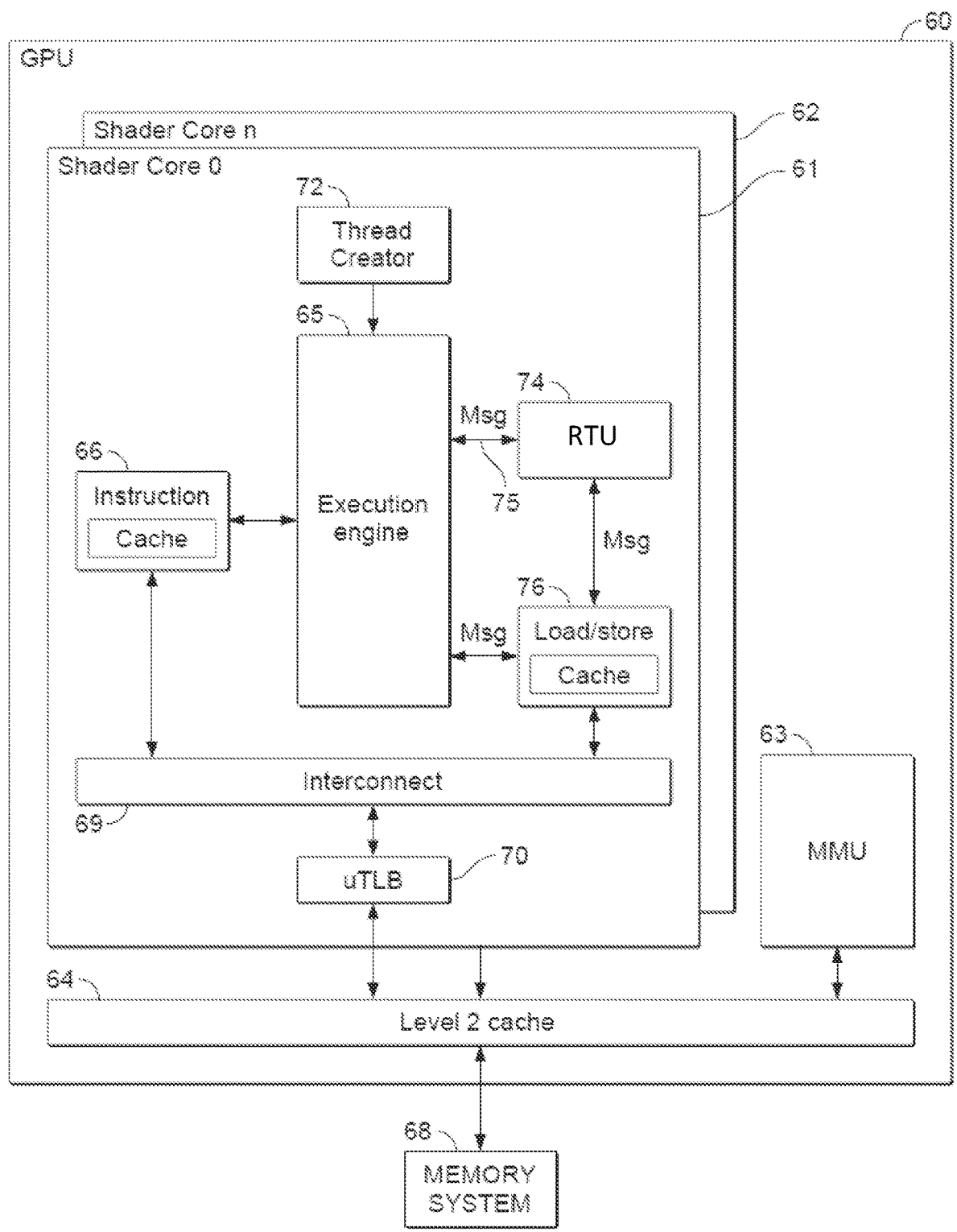
FIG. 6 shows schematically an exemplary graphics processor that can be implemented in embodiments of the present technology.

FIG. 6 shows schematically the relevant elements and components of a graphics processor (GPU) 60 of the present embodiments, which may be implemented as the graphics processor 2 of FIG. 1.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller). In FIG. 6, the relevant configuration of one shader core 61 is schematically shown, but as will be appreciated by those skilled in the art, other further shader cores of the graphics processor 60 may be configured in a corresponding manner.

The graphics processor (GPU) shader cores 61, 62 are programmable processing units (circuits) that perform processing operations by running small programs for each "item" in an output to be generated such as a render target (e.g. a frame). An "item" in this regard may be, e.g. a vertex, one or more sampling positions, etc. The shader cores process each "item" by means of one or more execution threads that execute the instructions of the shader program (s) in question for the "item". Typically, there will be multiple execution threads each executing simultaneously (in parallel).

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted that FIG. 6 is a schematic representation, and that, for example, the shown functional units may share significant hardware circuits in practice, even though they are shown schematically as separate units herein. It will also be appreciated that each of the elements and units, etc., of the graphics processor 60 may, unless otherwise indicated, be implemented as desired and accordingly comprises, e.g., appropriate circuits (processing logic), etc., for performing the necessary operation and functions.

As shown in FIG. 6, each shader core of the graphics processor 60 includes an appropriate programmable execution unit (execution engine, execution circuitry) 65 that is operable to execute graphics shader programs for execution threads to perform graphics processing operations.

The shader core 61 includes an instruction cache 66 that stores instructions to be executed by the programmable execution unit 65 to perform graphics processing operations. The instructions to be executed may be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data may be fetched/stored by the load/store unit 76 via the interconnect 69 and the micro-TLB 70.

In order to perform graphics processing operations, the programmable execution unit 65 executes graphics shader programs (sequences of instructions) for respective execution threads (e.g. corresponding to respective sampling positions of a frame to be rendered). Accordingly, the shader core 61 further comprises a thread creator (generator) 72 operable to generate execution threads for execution by the programmable execution unit 65.

In some embodiments, the ray tracing traversal operation may be performed for a group of plural rays together. This allows processing resources for groups of rays to be shared.

In particular, a ray tracing traversal program is executed by a group ("warp") of plural execution threads, with each ray in the group of plural rays being processed by a corresponding execution thread in a group of plural execution threads that are executing the program at the same time. The thread creator (generator) 72 may thus generate groups ("warps") of plural execution threads, and the programmable execution unit 65 may execute shader programs for a group ("warp") of plural execution threads together, e.g. in lockstep, e.g., one instruction at a time. In such embodiments, each group of rays may include 32 rays (and correspondingly each group or "warp" of execution threads includes 32 threads), but other numbers are of course possible.

As shown in FIG. 6, the shader core 61 in the present embodiment also includes a ray tracing circuit (unit) ("RTU") 74, which is in communication with the programmable execution unit 65, and which is operable to perform the required ray-volume testing during the ray tracing acceleration data structure traversals (e.g. the operation of step 42 of FIG. 4A) for rays being processed as part of a ray tracing-based rendering process, in response to messages 75 received from the programmable execution unit 65.

In the present embodiments the RTU 74 is also operable to perform the required ray-primitive testing (e.g. the operation of step 43 of FIG. 4A). The RTU 74 is also able to communicate with the load/store unit 76 for loading in the required data for such intersection testing.

In the present embodiments, the RTU 74 of the graphics processor is a (substantially) fixed-function hardware unit (circuit) that is configured to perform the required ray-volume and ray-primitive intersection testing during a traversal of a ray tracing acceleration data structure to determine geometry for a scene to be rendered that may be (and is) intersected by a ray being used for a ray tracing operation. However, some amount of configurability may be provided. Other arrangements are of course possible. For example, ray-volume and/or ray-primitive intersection testing may be performed by the programmable execution unit 65 (e.g. in software).

Figure 7:
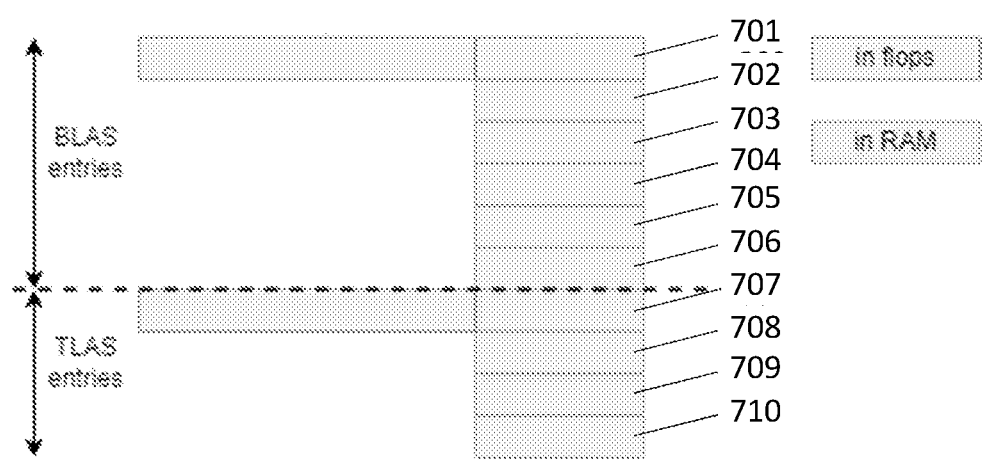
FIG. 7 shows schematically a stack layout that may be used for managing a ray tracing traversal operation.

FIG. 7 illustrates an exemplary stack of entries to be processed by a shader core such as shader cores 61, 62. In the present example, the stack includes six stack entries 701-706 for BLAS nodes at the top of the stack, and four stack entries 707-710 for TLAS nodes at the bottom of the stack.

In the present embodiments, the acceleration structure traversal order is configured such that when there is a choice between visiting a leaf node or an internal node of an acceleration structure next, the leaf node is visited next. Other orders are possible in other embodiments. To facilitate this, as illustrated in FIG. 7, a BLAS leaf node entry 701 (when present in the stack) is maintained as the topmost BLAS stack entry, and a TLAS leaf node entry 707 (when present in the stack) is maintained as the topmost TLAS stack entry. This moreover means that there can be a maximum of one BLAS leaf node stack entry and one TLAS leaf node stack entry present in a stack at any one time. Thus, in the present example, there is only one BLAS leaf node entry 701, and only one TLAS leaf node entry 707.

In the present embodiments, the local storage 612, 622 of each shader core is provided with registers (flip-flops) that can store two larger (e.g. 96 bit), leaf node entries for each ray it is tracing. The topmost BLAS stack entry and the topmost TLAS stack entry are then stored in these registers. Since the top entry in the stack is accessed most frequently, this can facilitate fast stack access.

The other (less frequently accessed) entries are then stored in L1 cache (RAM). As each of these other entries can only be a smaller (e.g. 32 bit) internal node stack entry, this can minimise RAM requirements. Other arrangements are possible.

Figure 8:
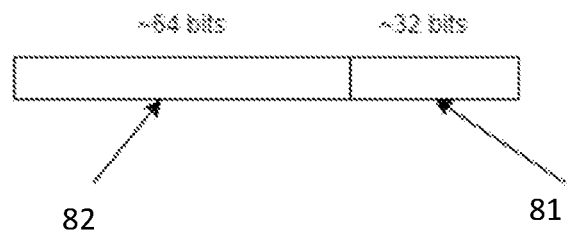
FIG. 8 shows an exemplary stack entry.

FIG. 8 illustrates an exemplary stack (test record) entry, according to the embodiments. In the present embodiments, each stack entry includes node information 81 that includes information indicating a volume associated with a node to be tested and any child nodes that are associated with the node. A stack entry that relates to a leaf node further includes leaf information 82 that may indicate geometry represented by the leaf node in question (e.g. in the case of a BLAS leaf node) or references to one or more other (e.g. BLAS) acceleration structures together with shading and transformation information (e.g. in the case of a TLAS leaf node).

In the present embodiments, the node information 81 comprises 32 bits, and the leaf information 82 comprises 64 bits. A leaf node stack entry thus comprises 96 bits, whereas an internal node stack entry comprises only 32 bits. Other arrangements and sizes are of course possible.

Figure 9:
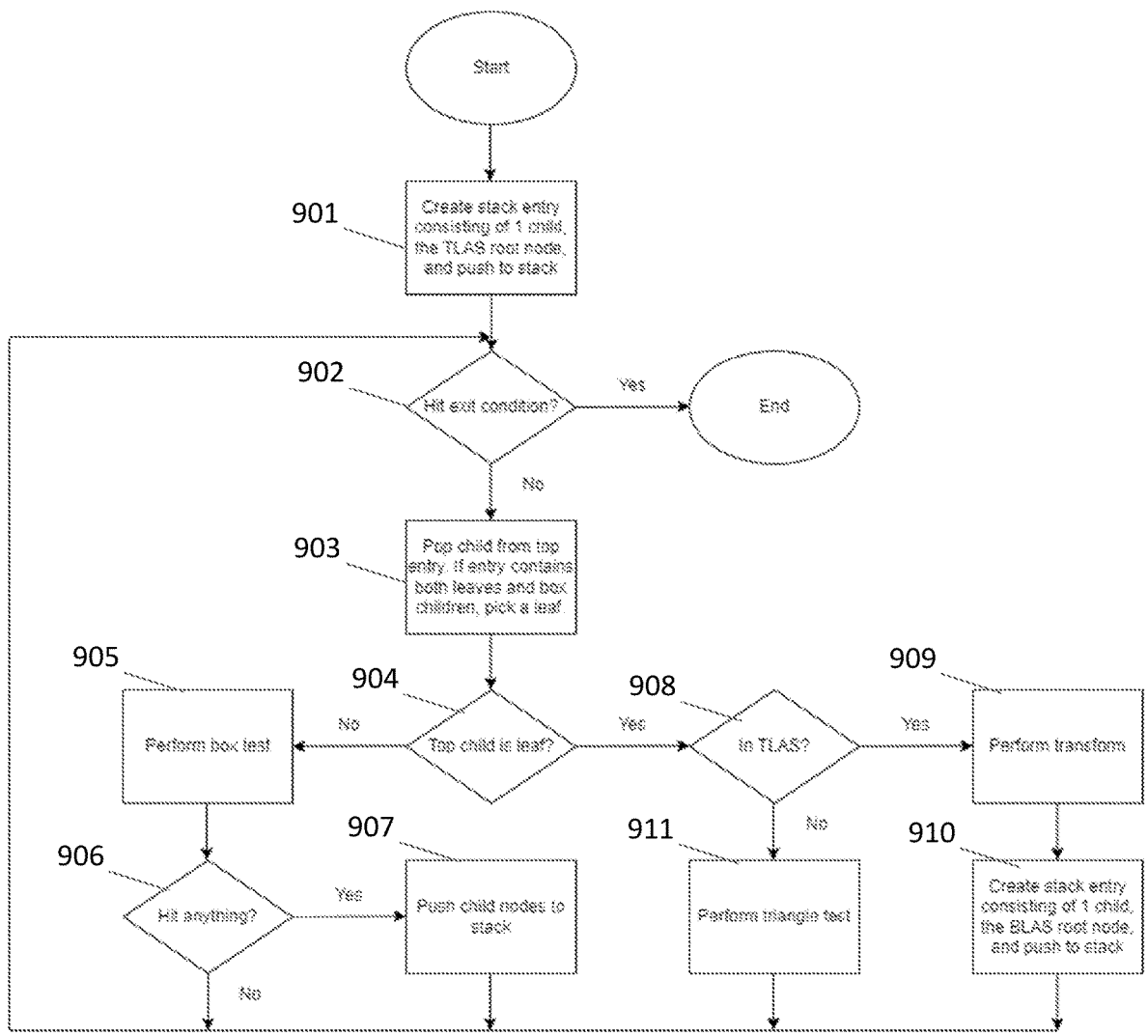
FIG. 9 shows a flow chart illustrating an exemplary ray tracing traversal operation.

FIG. 9 is a flowchart showing the operation of a shader core 61, 62 of the graphics processor 60 when performing a ray tracing-based rendering process in the embodiments. FIG. 9 shows the operation in respect of a given ray, and this operation is performed for each ray being traced.

The process begins with a first entry being pushed to the stack corresponding to the TLAS root node (step 901). There is then a check to determine whether tracing for the current ray is complete (step 902), and if not, the process continues with the top entry in the stack being popped (step 903) for processing.

As the TLAS root node is expected to be an internal node (i.e. not a leaf node) (at step 904), it is subjected to a ray-volume intersection test (at step 905), and for any child nodes determined to be intersected (at step 906), a corresponding stack entry is pushed to the stack (at step 907). The process then returns to step 902 to determine whether tracing for the current ray is complete, and if not, the process continues with the top entry in the stack being popped (step 903) for processing.

As shown in FIG. 9, when a TLAS leaf node is reached (step 908), transformation information associated with the leaf node is used to transform the ray (step 909), and a stack entry corresponding to a BLAS root node is pushed to the stack (step 910). The process then returns to step 902 to determine whether tracing for the current ray is complete, and if not, the process continues with the top entry in the stack being popped (step 903) for processing.

As a BLAS root node is expected to be an internal node (i.e. not a leaf node) (at step 904), it is subjected to a ray-volume intersection test (at step 905), and for any child nodes determined to be intersected (at step 906), a corresponding stack entry is pushed to the stack (at step 907). The process then returns to step 902 to determine whether tracing for the current ray is complete, and if not, the process continues with the top entry in the stack being popped (step 903) for processing.

As shown in FIG. 9, when a BLAS leaf node is reached (step 908), the geometry associated with the leaf node is subjected to a ray-primitive intersection test (at step 911). The process then returns to step 902 to determine whether tracing for the current ray is complete, and if not, the process continues with the top entry in the stack being popped (step 903) for processing.

In some approaches, before a stack entry for a node is pushed to the stack (before step 901), a test (distance culling) may be performed to check if the distance to the volume associated with the node against a ray maximum range, and if the distance is found to equal or exceed the ray maximum range, a stack entry is not generated for the child nodes associate with the node. However, since distances are not recorded when nodes are stacked, once stack entries are generated for nodes and stacked, ray tracing process continues for the stack even when the ray maximum range is updated to a smaller value and one or more stacked nodes exceed the updated ray maximum range.

The present technology concerns the distance culling of nodes and proposes to record the distance to the volumes associates with at least some of the nodes when the nodes are stacked to enable the stacked nodes to be culled for distance as appropriate.

Figure 10:
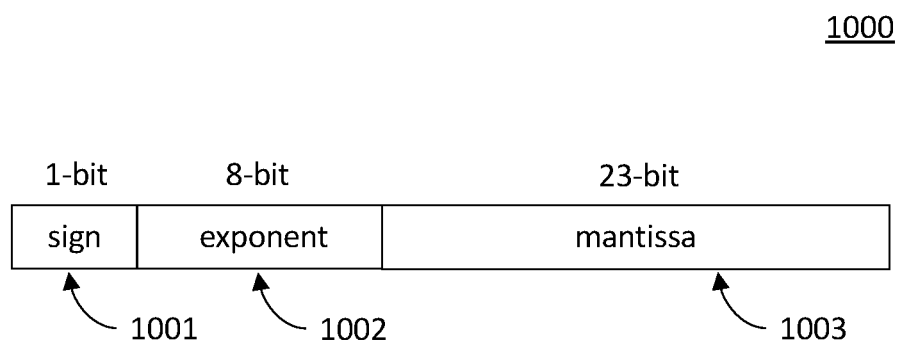
FIG. 10 shows an exemplary distance data layout.

FIG. 10 illustrates an example of distance data that represents a distance of a volume with respect to the viewpoint of a ray in a ray tracing operation. In the present example, the distance data 1000 is a 32-bit floating point number (FP32) comprising a single sign bit 1001, an exponent portion 1002 formed of 8 bits, and a mantissa portion 1003 formed of 23 bits. Other sizes of distance data and/or other arrangements are of course possible.

The Applicant has recognized that it may not be necessary to store distance data for a node as a full FP32 value such as shown in FIG. 10. For example, nodes associated with volumes that are behind the ray origin (the imaginary camera) do not need to be considered for ray tracing, as any objects within those volumes are not in view. Thus, in some embodiments, the sign bit 1001 of the distance data may be discarded.

It is further recognized that if an approximation of a distance is stored as distance data, then it is possible to store each distance using a smaller storage area (e.g. less than FP32) or to store distance data for more nodes using the same storage area. In particular, the range of a distance value may be reduced to enable the exponent 1002 to be truncated (made shorter e.g. than 8 bits), and/or the precision of the distance value may be reduced to enable the mantissa 1003 to be truncated (made shorter e.g. than 23 bits).

When approximating a distance value and truncating the exponent and/or mantissa, it may be desirable to round the distance value down instead of up in favor of false positives (where distance values that are slightly above the ray maximum range are falsely deemed within range) over false negative (where distance values that are slightly below the ray maximum range are falsely deemed outside range). Taking a more conservative approximation approach ensures that the loss of range and precision as a result of the approximation does not lead to a loss of rendering performance.

By discarding the sign bit and/or truncating the exponent and/or mantissa of a distance value, it is possible to reduce storage requirement with respect to each distance value, allowing distance data to be stored for a larger number of nodes.

It is further recognized that it may not be practical or possible to store distance data for every stacked node, even in a truncated form. Therefore, in some embodiments, it may be arranged such that only distances associated with nodes near the bottom of an acceleration structure (e.g. the 5, 10, 15, 20 deepest nodes, etc.) are recorded. The arrangement of an acceleration structure is such that there are a much larger number of nodes near the bottom of the acceleration structure than near the top, and so there are more possibilities for storing distance data for nodes near the bottom, and thus a higher likelihood that at least some of these nodes have distances exceeding an updated ray maximum range and can be culled.

In alternative embodiments, it may be arranged such that only distances associated with nodes higher up the acceleration structure are recorded. Nodes higher up the acceleration structure are more likely to be parent node to many child and leaf nodes, and so ray tracing operation from a node near the top of the structure would involve more traversal steps. As such, storing distance data for a node higher up the acceleration structure that leads to such a node being culled can significantly reduce the number of traversal steps through a single cull.

In other embodiments, it is also possible to store distance data for any nodes in any positions of an acceleration structure in any combination or proportions.

Figure 11:
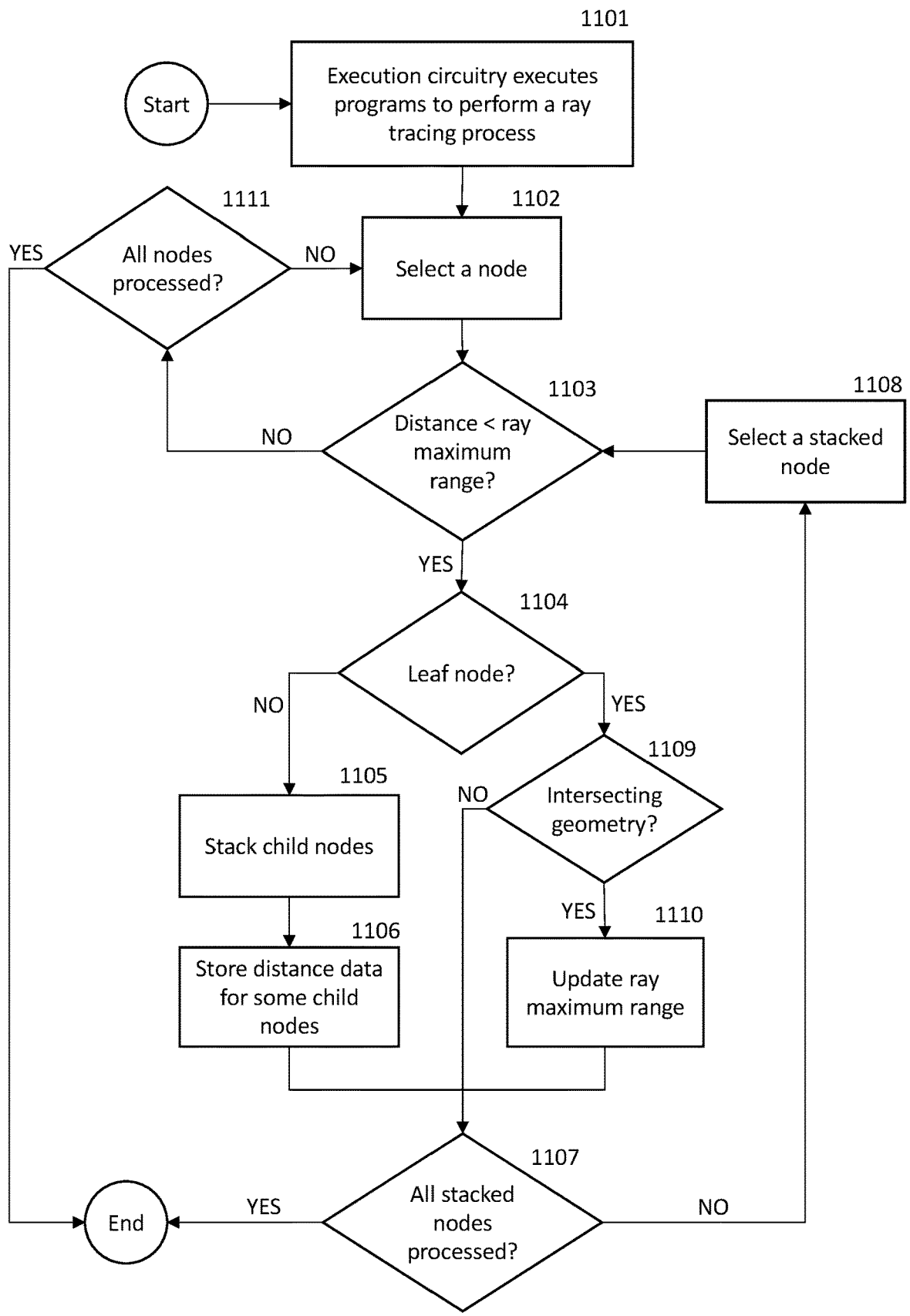
FIG. 11 is a flow diagram illustrating the operation of a graphics processor according to an embodiment.

FIG. 11 illustrates an exemplary method of operating a graphics processing system when rendering a frame representative of a view of a scene using a ray tracing process. The graphics processing system comprises a graphics processor, such as the graphics processor 60, that comprises storage, execution circuitry, and ray tracing circuitry, as described with reference to FIG. 6.

The method begins at step 1101, when the execution circuitry executes programs to perform graphics processing operations using a ray tracing process to render the frame. The ray tracing process then traverses an acceleration structure for each ray. At step 1102, a node of the acceleration structure is selected.

In the embodiments, the ray tracing circuitry may be arranged to first perform distance culling for a given ray at step 1103, to determine for a volume associated with the current node under consideration whether a distance to the volume from the ray origin is within a ray maximum range of the current ray. At the start of the process, the ray maximum range is typically set to infinity (or a large number) and so, at the start of the process, the distance to the volume associated with the current node is expected to be within the ray maximum range.

Thus, if it is determined that the distance to the volume is within the ray maximum range and the current node is not a leaf node (step 1104, NO branch), the child nodes of the current node are stacked (step 1105) to be subsequently tested and ray tracing process proceeds further. Moreover, the ray tracing circuitry, according to the embodiments, is configured to also store distance data, as described above, for one or more of the stacked nodes (step 1106).

Then, the ray tracing process proceeds (step 1107, NO branch) to select a stacked node (or more than one node in parallel if desired) at step 1108, and check whether the distance to the volume associated with the selected stacked node is within the ray maximum range (step 1103). If, at step 1107, it is determined that all stacked nodes have been processed (no further stacked node to select), the process ends.

At step 1104, if the current node is a leaf node (YES branch), the ray tracing circuitry performs tests to determine whether the ray intersects geometry in the volume associated with the current node that is a leaf node (step 1109).

If no geometry is intersected, the ray tracing process proceeds through the stack (step 1107, NO branch) to select a next stacked node (step 1108). The ray tracing process ends when all stacked nodes have been processed (step 1107, YES branch).

However, if the ray tracing circuitry determines that the ray intersects geometry (e.g. primitives) in the volume associated with the current node, the graphics processor updates the ray maximum range based on the distance to intersected geometry (step 1110). According to the embodiments, for nodes that have been stacked with the associated distance data, if is possible for the ray tracing circuitry to distance-cull these stacked nodes based on the updated ray maximum range by checks the associated distance data against the updated ray maximum range at step 1103. If it is determined that the distance associated with a stacked node now exceeds the updated ray maximum range (step 1103, NO branch), then the operation proceeds to check if all nodes have been processed (step 1111). If there remain nodes to be processed (step 1111, NO branch), a next node is selected (step 1102). If there are no remaining nodes to be processed (step 1111, YES branch), the process ends.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A graphics processor comprising:
   storage;
   execution circuitry to execute programs to perform graphics processing operations using a ray tracing process to generate a render output representative of a view of a scene; and
   ray tracing circuitry to trace a ray by performing tests to determine whether the ray may intersect geometry in the scene, the ray tracing circuitry being configured to store one or more test record entries for a ray being traced in the storage, each test record entry being indicative of a test to be performed to trace the ray,
   wherein the ray tracing circuitry is further configured to store distance data respective of one or more test record entries, the distance data respective of a test record entry being data representative of a distance to a volume of the scene associated with the test record entry;
   wherein a distance to a volume of the scene is represented by an exponent, and the ray tracing circuitry is configured to store distance data respective of a test record entry associated with the volume of the scene by rounding down the exponent of the distance to the volume, and
   wherein the exponent of the distance to the volume is represented by a first plurality of exponent bits, and rounding down the exponent of the distance to the volume truncates the first plurality of exponent bits to a second plurality of exponent bits such that the distance data respective of the test record entry associated with the volume of the scene includes the second plurality of exponent bits less than the first plurality of exponent bits.

2. The graphics processor of claim 1, wherein the ray tracing circuitry is configured to determine, for a volume of the scene, whether a distance to the volume is within a ray maximum range, and to not store a test record entry associated with the volume when the distance to the volume is not within the ray maximum range.

3. The graphics processor of claim 2, wherein, upon determining that the ray intersects geometry in the volume, the ray tracing circuitry is configured to update the ray maximum range based on the distance to the geometry in the volume.

4. The graphics processor of claim 3, wherein the ray tracing circuitry is configured to compare the stored distance data with the updated ray maximum range, and to discard a test record entry when the distance data associated with the test record entry exceeds the updated ray maximum range.

5. The graphics processor of claim 1, wherein a distance to a volume of the scene comprises a sign, and the ray tracing circuitry is configured to store distance data respective of a test record entry associated with the volume of the scene by discarding the sign of the distance to the volume.

6. The graphics processor of claim 1, wherein a distance to a volume of the scene comprises a mantissa, and the ray tracing circuitry is configured to store distance data respective of a test record entry associated with the volume of the scene by rounding down the mantissa of the distance to the volume.

7. The graphics processor of claim 6, wherein the mantissa of the distance to the volume is represented by a third plurality of mantissa bits, and rounding down the mantissa of the distance to the volume truncates the third plurality of mantissa bits to a fourth plurality of mantissa bits such that the distance data respective of the test record entry associated with the volume of the scene comprises the fourth plurality of mantissa bits less than the third plurality of mantissa bits.

8. The graphics processor of claim 1, wherein the ray tracing circuitry is configured to perform tests to determine whether the ray intersects geometry in the scene by performing a traversal of a ray tracing acceleration data structure indicative of the distribution of geometry for the scene.

9. The graphics processor of claim 8, wherein the ray tracing acceleration data structure comprises one or more nodes, each node representing a volume of the scene.

10. The graphics processor of claim 9, wherein the one or more nodes of the ray tracing acceleration data structure are arranged in a hierarchy of bounding volume, and the ray tracing circuitry is configured to only store distance data for nodes near the bottom of the hierarchy.

11. A method of operating a graphics processing system when rendering a frame representative of a view of a scene comprising one or more objects using a ray tracing process, the graphics processing system comprising a graphics processor that comprises storage, execution circuitry, and ray tracing circuitry, the method comprising:

the execution circuitry executing programs to perform graphics processing operations using a ray tracing process to generate a render output representative of a view of a scene;

the ray tracing circuitry tracing a ray by performing tests to determine whether the ray intersects geometry in the scene, and storing one or more test record entries for a ray being traced in the storage, each test record entry being indicative of a test to be performed to trace the ray; and the ray tracing circuitry storing distance data respective of one or more test record entries, the distance data respective of a test record entry being data representative of a distance to a volume of the scene associated with the test record entry, wherein a distance to a volume of the scene is represented by an exponent, and the ray tracing circuitry is configured to store distance data respective of a test record entry associated with the volume of the scene by rounding down the exponent of the distance to the volume, and wherein the exponent of the distance to the volume is represented by a first plurality of exponent bits, and rounding down the exponent of the distance to the volume truncates the first plurality of exponent bits to a second plurality of exponent bits such that the distance data respective of the test record entry associated with the volume of the scene includes the second plurality of exponent bits less than the first plurality of exponent bits.

12. The method of claim 11, further comprising the ray tracing circuitry determining, for a volume of the scene, whether a distance to the volume is within a ray maximum range, and not storing a test record entry associated with the volume when the distance to the volume is not within the ray maximum range.

13. The method of claim 12, further comprising, upon determining that the ray intersects geometry in the volume, the ray tracing circuitry updating the ray maximum range based on the distance to the geometry in the volume.

14. The method of claim 13, further comprising the ray tracing circuitry comparing the stored distance data with the updated ray maximum range, and discarding a test record entry when the distance data associated with the test record entry exceeds the updated ray maximum range.

15. The method of claim 11, wherein a distance to a volume of the scene comprises a sign, and the method comprises the ray tracing circuitry discarding the sign of the distance to the volume of the scene when storing distance data respective of a test record entry associated with the volume.

16. The method of claim 11, wherein a distance to a volume of the scene comprises a mantissa, and the method comprises the ray tracing circuitry is storing distance data respective of a test record entry associated with the volume of the scene by rounding down the mantissa of the distance to the volume.

17. A non-transitory computer readable storage medium storing software code which when executing on one or more processors performs a method of compiling a shader program to be executed by a graphics processor operable to execute graphics processing programs to perform graphics processing operations, the graphics processor comprising storage, execution circuitry, and ray tracing circuitry, the shader program comprising instructions which, when executed, cause:

the execution circuitry to execute programs to perform graphics processing operations using a ray tracing process to generate a render output representative of a view of a scene; and the ray tracing circuitry to trace a ray by performing tests to determine whether the ray intersects geometry in the scene, to store one or more test record entries for a ray being traced in the storage, each test record entry being indicative of a test to be performed to trace the ray, and to store distance data respective of one or more test record entries, the distance data respective of a test record entry being data representative of a distance to a volume of the scene associated with the test record entry, wherein a distance to a volume of the scene is represented by an exponent, and the ray tracing circuitry is configured to store distance data respective of a test record entry associated with the volume of the scene by rounding down the exponent of the distance to the volume. and wherein the exponent of the distance to the volume is represented by a first plurality of exponent bits, and rounding down the exponent of the distance to the volume truncates the first plurality of exponent bits to a second plurality of exponent bits such that the distance data respective of the test record entry associated with the volume of the scene includes the second plurality of exponent bits less than the first plurality of exponent bits.

* * * * *